Figure 1:
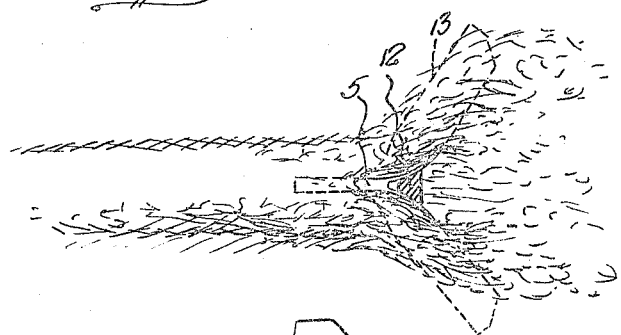

Oct. 19, 1926.

W. R. MOCK

ATTACHMENT FOR CORN LISTERS

Filed Jan. 29, 1926

1,603,486

Inventor
W. R. Mock

By Clarence A. O'Brien
Attorney

Patented Oct. 19, 1926.

1,603,486

UNITED STATES PATENT OFFICE.

WILLIAM R. MOCK, OF CARNEGIE, OKLAHOMA.

ATTACHMENT FOR CORN LISTERS.

Application filed January 29, 1926. Serial No. 84,672.

The present invention relates to improvements in listers, and more particularly to an attachment for a lister useful in preparing the ground for preparing row crops or back-setting listed ground for wheat or other sown grain.

The attachment may be used on any of the well known makes of listers now in use to take the place of the lister share and mold board. The share and the mold board are unbolted from the frog, which is attached to the beam of the lister, and then this attachment is engaged with the frog of the lister with two bolts, rivets, or other fastening elements such as were used for holding the lister share to the frog.

This attachment takes the place of the lister share and mold board in preparing the ground for planting any kind of crop and especially where the ground has been listed and it needs to be leveled down to seed bed for wheat or other sown grain.

An important object of the invention is to provide an attachment having the above advantages which is exceedingly simple in its construction, strong and durable, efficient in use, compact, easy of assemble and disassemble, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
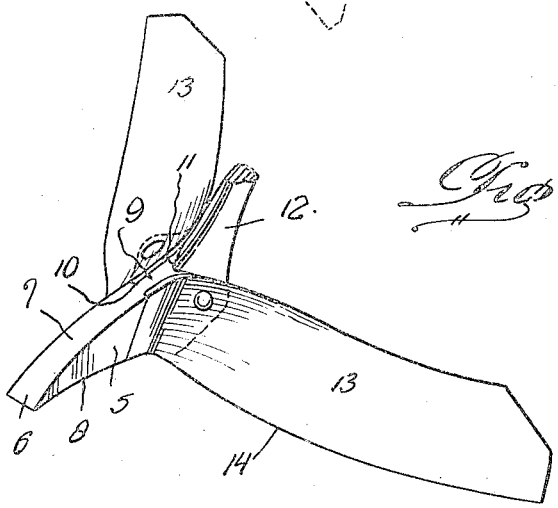
Figure 3:
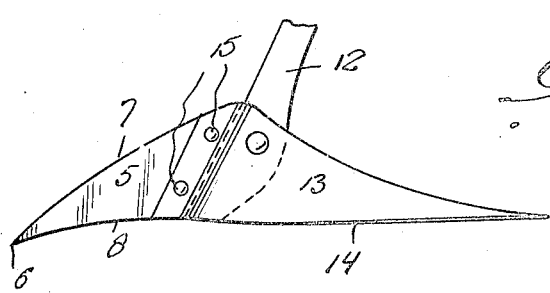

Figure 1 is a top plan view of the attachment showing the manner in which the same is used in the soil, Fig. 2 is a perspective view of the attachment, and Fig. 3 is a side elevation thereof showing a slight modification.

Referring to the drawing in detail, it will be seen that 5 designates a forging or a single piece of material, preferably plow steel, having an oblong triangular formation with the point 6 forwardly disposed, an upper slightly curved edge 7 and a lower slightly curved edge 8. The rear end of this point forming forging is slightly channeled or grooved as is indicated at 11 for receiving the forward edge of the frog plow which is substantially triangular in cross section.

A pair of blades 13 are associated with the forging 5. Blade 13 has one edge sharpened as is indicated at 14, that is, the forward edge. These blades are of a substantially oblong construction, and are twisted so that the transverse dimension of one end is angularly disposed to the transverse dimension of the other end. In fact, the transverse dimension of the outer ends of the blades are substantially horizontal. The inner ends of the blades are curved so as to fit against the sides of the reduced end 9 of the forging 5 so that their edges abut the shoulders 10. The last mentioned inner ends of the blades 13 may be welded to the forging 5 as is contemplated in Fig. 2 or riveted thereto as is indicated at 15 in Fig. 3.

A construction of this lister attachment is such that it will work in any sandy or tight land. The construction of the point forming forging 5 is such that it will not clog up when used in back-setting in weedy ground that has been listed. The blades are curved as described so that they will cut all of the ground in the ridge but will not throw up the ridge as a lister of the ordinary type will do, when using a mold board and share in the usual way.

The inner ends of the blades are curved so that the major portions of the blades diverge rearwardly from each other. The major portions of the median longitudinal dimensions of the blades are straight. Because of the curve or twist in the blades, they will leave the listed ground in a level condition such as is accomplished with a common stirring plow. My attachment, however, mulches the ground finer than a stirring plow. In fact only one harrowing is needed to get the ground in condition for seeding after my attachment has been used.

The attachment is useful in planting row crops and will cut through all ground in listed ridges, thereby destroying all weeds or vegetation, that may have started before planting time, and thereby providing a fine seed bed.

It is thought that the construction, operation, utility, and advantages of my invention will now be clearly understood by those skilled in this art without a more detailed description thereof. The present embodiment of the invention has been disclosed in detail, since in actual practice it attains the features of advantage enumerated as desirable in the statement of the invention and the above description.

It will be apparent, however, that numerous changes in the details of construction and the combination and arrangement of parts may be resorted to without departing from the spirit or scope of the invention as hereinafter claimed, or sacrificing any of its advantages.

Having thus described by invention, what I claim as new is:

1. A lister attachment of the class described, including in combination, a point forming forging, a pair of blades having their inner ends fixed to the rear end of the forging and curved to diverge rearwardly from each other, said blades being of an oblong section and twisted transversely so that the transverse dimension of their outer ends are to fall substantially horizontal and angularly to the transverse dimensions of the inner ends.

2. A lister attachment of the class described including in combination, a point forming forging, a pair of blades having their inner ends fixed to the rear end of the forging and curved to diverge rearwardly from each other, said blades being of an oblong section and twisted transversely so that the transverse dimension of their outer ends are to fall substantially horizontal and angularly to the transverse dimensions of the inner ends, the median longitudinal dimensions of the major portions of said blades being straight.

3. A lister attachment of the class described including in combination, a point forming forging, a pair of blades having their inner ends fixed to the rear end of the forging and curved to diverge rearwardly from each other, said blades being of an oblong section and twisted transversely so that the transverse dimension of their outer ends are to fall substantially horizontal and angularly to the transverse dimensions of the inner ends, the median longitudinal dimensions of the major portions of said blades being straight, the forward and bottom edge of each blade being sharpened.

In testimony whereof I affix my signature.

WILLIAM R. MOCK.